Jan. 26, 1965 W. J. HIGGINS 3,167,341
NESTABLE SHIPPING PALLETS
Filed Aug. 16, 1961 5 Sheets-Sheet 1

INVENTOR.
WILLIAM J. HIGGINS
BY
ATTORNEY

Jan. 26, 1965 W. J. HIGGINS 3,167,341
NESTABLE SHIPPING PALLETS
Filed Aug. 16, 1961 5 Sheets-Sheet 2

INVENTOR.
WILLIAM J. HIGGINS
BY
Louis B. Appleba
ATTORNEY

INVENTOR.
WILLIAM J. HIGGINS
BY
Louis B. Applebaum
ATTORNEY

Jan. 26, 1965 W. J. HIGGINS 3,167,341
NESTABLE SHIPPING PALLETS
Filed Aug. 16, 1961 5 Sheets-Sheet 4

INVENTOR.
WILLIAM J. HIGGINS
BY
Louis B. Appleton
ATTORNEY

United States Patent Office 3,167,341
Patented Jan. 26, 1965

3,167,341
NESTABLE SHIPPING PALLETS
William J. Higgins, 12 Capp St., Carteret, N.J.
Filed Aug. 16, 1961, Ser. No. 131,941
8 Claims. (Cl. 294—67)
(Granted under Title 35, U.S. Code (1952), sec. 266)

The invention described herein may be manufactured and used by or for the Government of the United States of America for governmental purposes without the payment of any royalties thereon or therefor.

This invention relates to improvements in pallets, and more particularly pertains to improvements in nestable shipping pallets.

Conventional shipping pallets are provided with some means for hoisting loads they carry by the use of sling bars. Most such pallets are constructed of wood providing a top and bottom deck and having wings adapted to accommodate a bar sling: Where metal is used in the fabrication of pallets, the wood design is adhered to substantially, and the pallets are of the non-nesting type. Virtually all nesting type metal pallets are classified as warehouse pallets, suitable for handling with fork lifts and hand trucks but not adapted to be transported by means of bar sling handling.

Nesting for space conservation is a desirable feature of pallets. The usual wood and metal shipping pallets that cannot be nested require over 6.5 cubic feet of storage space for a 40" x 48" pallet. Overseas shipment of empty pallets is particularly burdensome because of this excessive need of hold spaces, resulting in increased freightage costs. While the conventional nestable type metal pallet would be suited for overseas shipment, because of the lower cube requirements, the lack of hoisting means on the pallet necessarily creates a high labor cost, as a result of the consequent frequent rehandling of the pallet loads. The special needs inherent in the transport of military supplies emphasizes the need for nesting type shipping pallets.

The principal object of this invention is to provide a nestable shipping pallet adapted to be transported by means of a bar sling, an angle sling, the forks of a lift truck, and the like, and further adapted to provide all salient features of conventional shipping and warehouse pallets.

Other objects and many of the attendant advantages of this invention will be readily appreciated as the same becomes better understood by reference to the following detailed description when considered in connection with the accompanying drawings, wherein FIG. 1 is a perspective view of a pallet engaged by the forks of a lift truck (shown in dotted lines), showing a preferred embodiment of the invention;

Similar numerals refer to similar parts throughout the several views.

Figure 1:
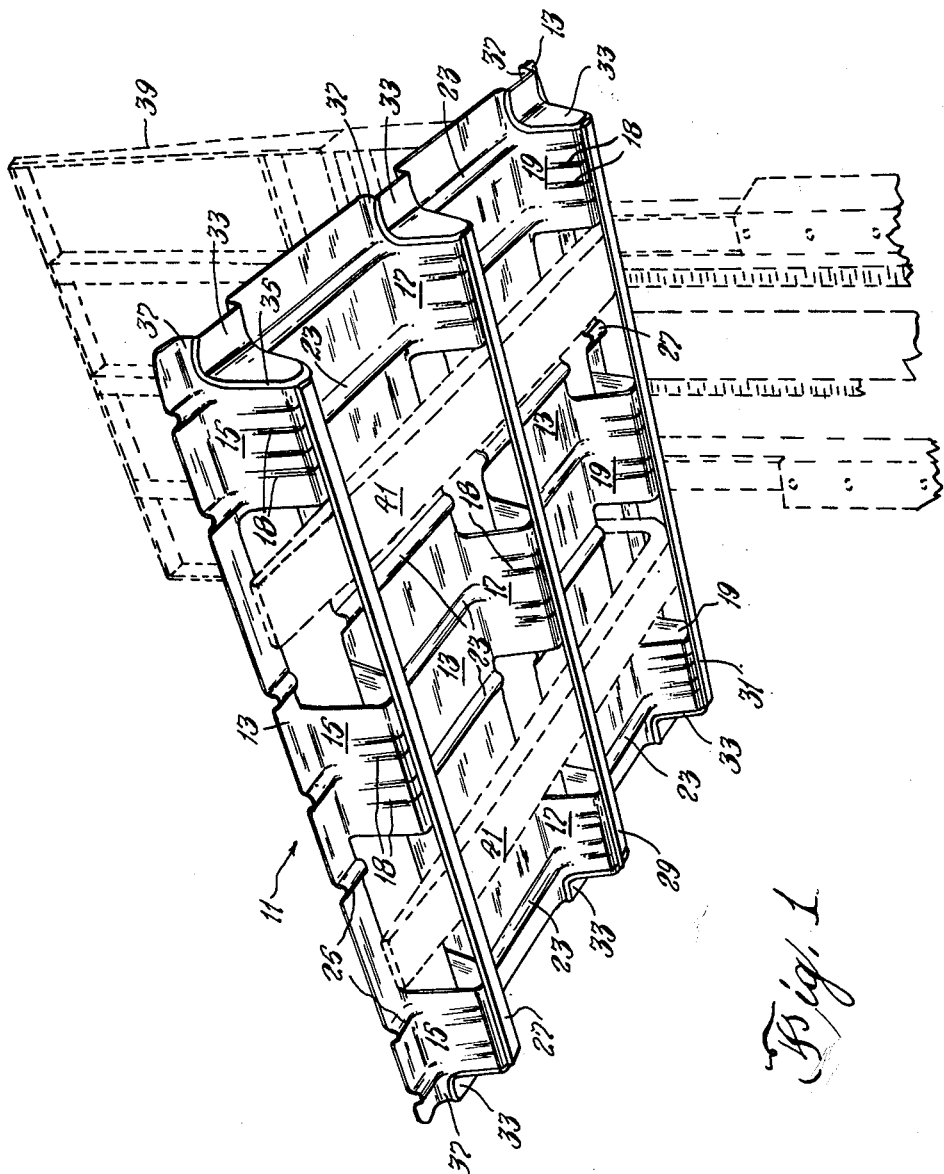

The pallet of FIG. 1 comprises a corrugated sheet metal rectangle 11, preferably formed integrally from a single piece. A platform for a load is defined by parallel longitudinal deck portions 13 all disposed in a common horizontal plane. Adjacent deck portions are bridged by a plurality of sets of depending tapered U-shaped members 15, 17 and 19, forming the nine legs for the platform, the sheet material between adjacent members of each set of legs being stamped out to permit entry of the forks of a lift truck, hereinafter described. Each leg has a plurality of reinforcing corrugations 18, and each leg is tapered so that it can be nested in the like leg of another pallet.

A plurality of parallel transverse ribs 23 bridge the deck portions between members 15 and 17, and between members 17 and 19. Similarly, a plurality of transverse ribs 25 extend across the outer deck portions 13, the deck portions that are distal member 17. The members 15 are connected at their foot portions by a reinforcing bar 27, which is welded thereon. Similarly, members 17 are connected at their foot portions by reinforcing bar 29, and members 19 are connected at their foot portions by reinforcing bar 31. Thus, the transverse bending moment of the pallet is increased substantially by the ribs and legs, and the lengthwise bending moment of the pallet is increased substantially by the legs and bars.

Formed end caps 33 are provided for the outer end of each outer leg 15, 17 and 19. Each end cap 33 is an L-shaped member having a continuous flange 35. The outer end of each outer leg 15, 17 and 19 is cut out to define an inverted L, the depth of cut being limited to retain depending lips 37. The flange 35 crowns such lips 37 and crowns the edge of the sides and the floor of the outer end of each such outer leg. The end caps are secured in position by welds 36, 38 and 40.

In use with a forklift truck, as shown in FIG. 1, the mast 39 of the truck is adapted to abut an edge of the pallet 11, with the forks 41 passing between legs 19, 17 and 15 respectively, through the cut out recesses defined by such legs, and passing between the deck portions 13 and the bars 27. In this way, the nether faces of portions 13 and seated on the forks 41, and are adapted to be released from engagement therewith when the pallet has its bars 27 seated on a bearing surface.

Figure 2:
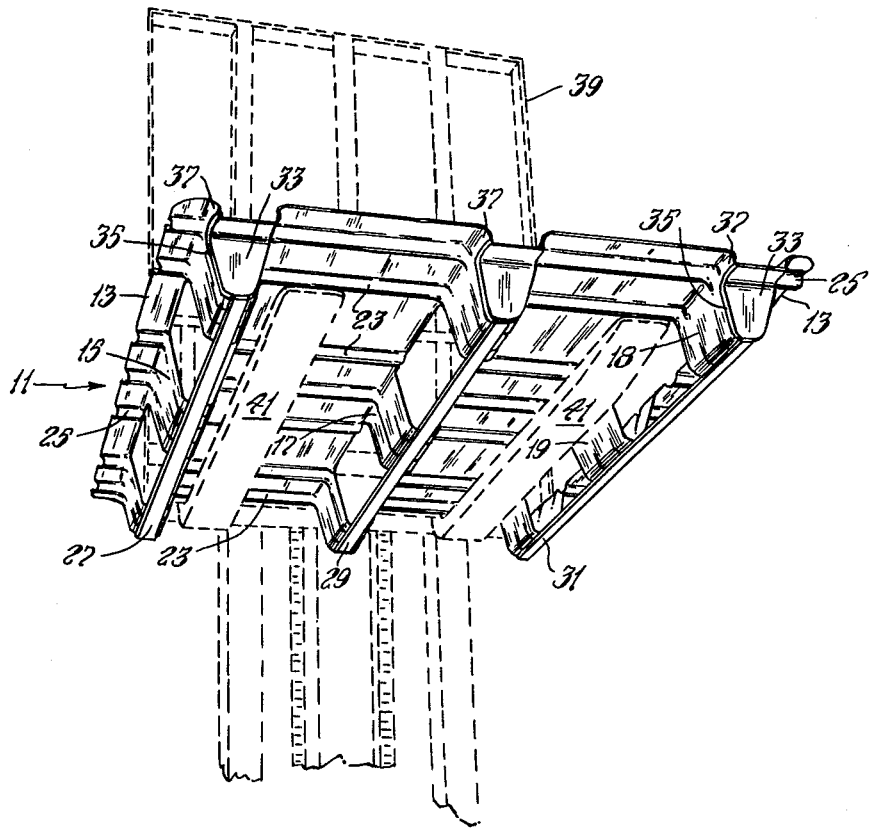
FIG. 2 is a perspective view of such pallet and lift truck, showing entry of the forks normal to the direction of entry shown in FIG. 1.
Figure 5:
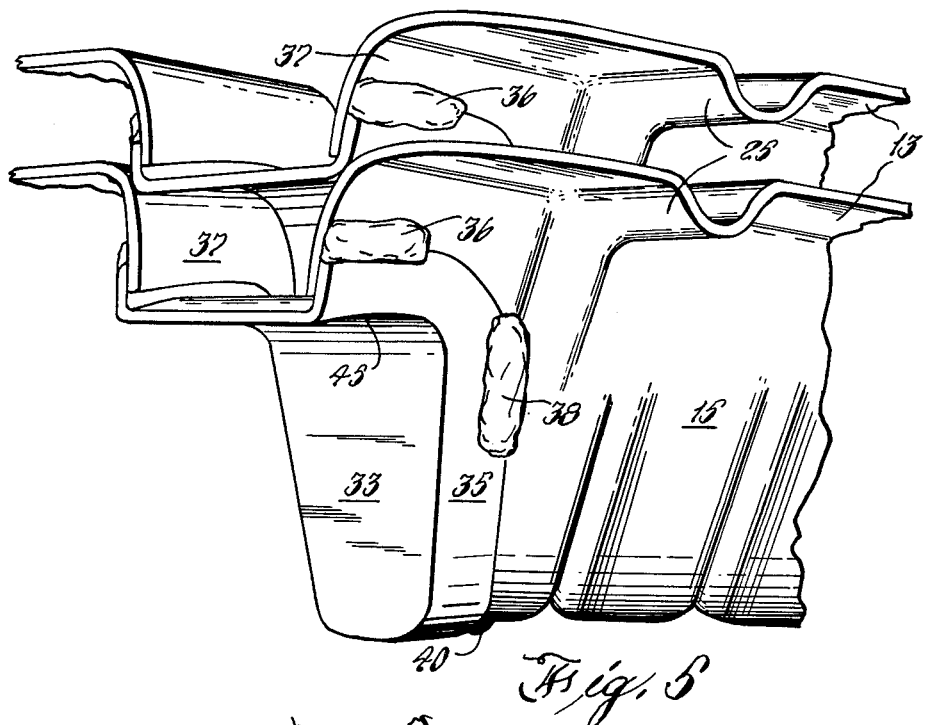
FIG. 5 is a fragmentary enlarged perspective view of two of the pallets of the structure shown in FIG. 1, showing the detail of the formed end caps and showing the manner of nesting of pallets.
Figure 6:
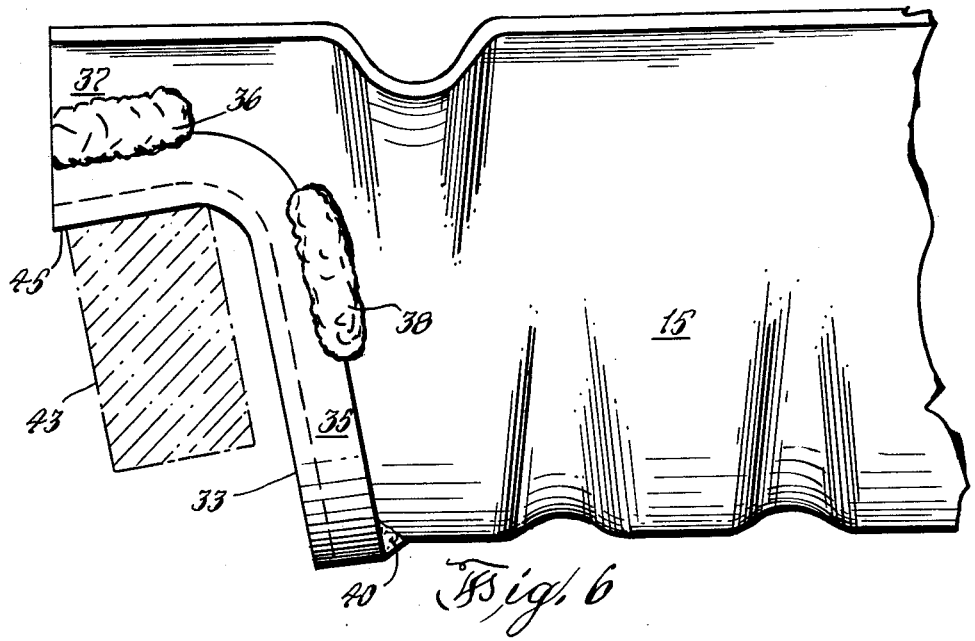
FIG. 6 is a fragmentary enlarged elevation of the pallet of FIG. 1 showing the the relation thereof to a bar of a bar sling.

FIG. 2 illustrates the adaptability of the pallet to four way fork lift entry. With the mast 39 of a fork lift truck abutting an edge of the pallet normal to the abutment edge of FIG. 1, the forks 41 pass between legs 15 and 17, and between legs 17 and 19, and the ribs 23 are adapted to straddle and be seated on said forks. The depth of the legs 15, 17 and 19 facilitates disengagement of the forks from the pallet when the bars 27 are seated on a bearing surface. FIG. 5 illustrates the nesting capability of the pallets of the structure shown in FIG. 1; FIG. 6 shows how the bar 43 of a bar sling is adapted to abut the nether face 45 of the end cap 33 to permit bar sling transport of the pallet.

Figure 3:
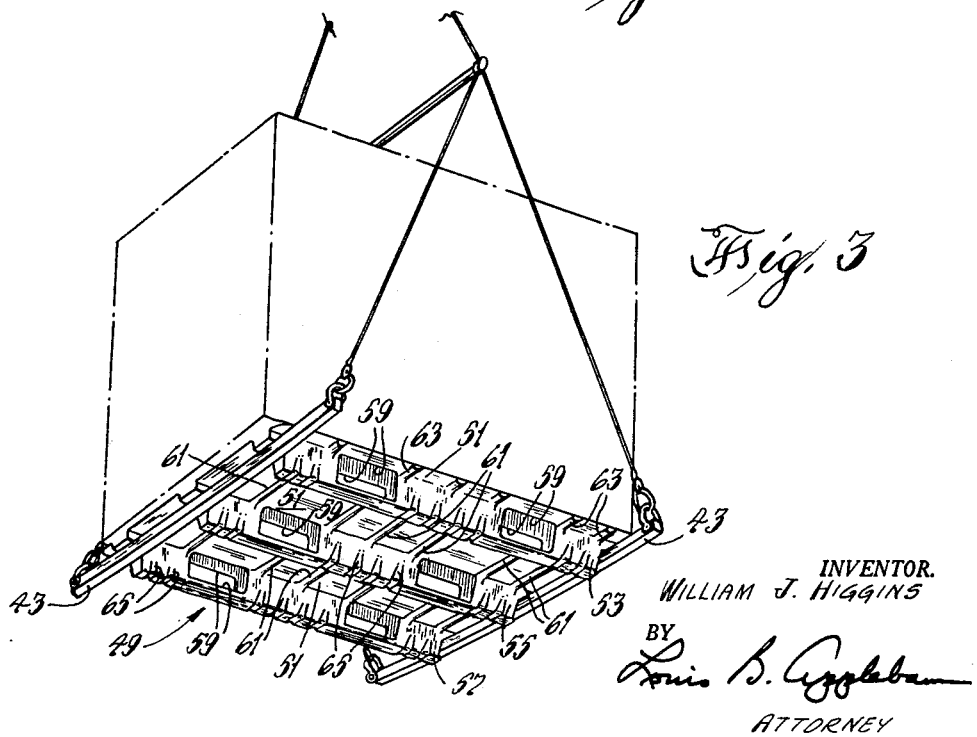
FIG. 3 is a perspective view of a modified form of such pallet, shown engaged by a bar sling.
Figure 4:
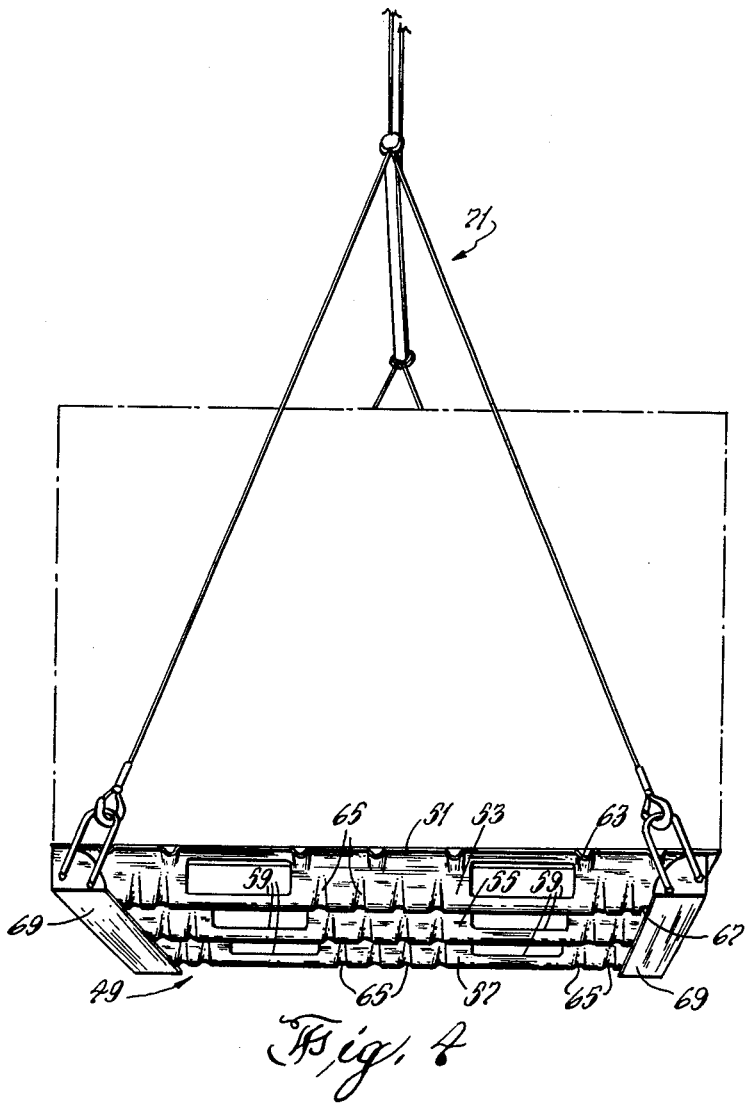
FIG. 4 is a perspective view of the pallet of FIG. 3, shown engaged by an angle sling.
Figure 7:
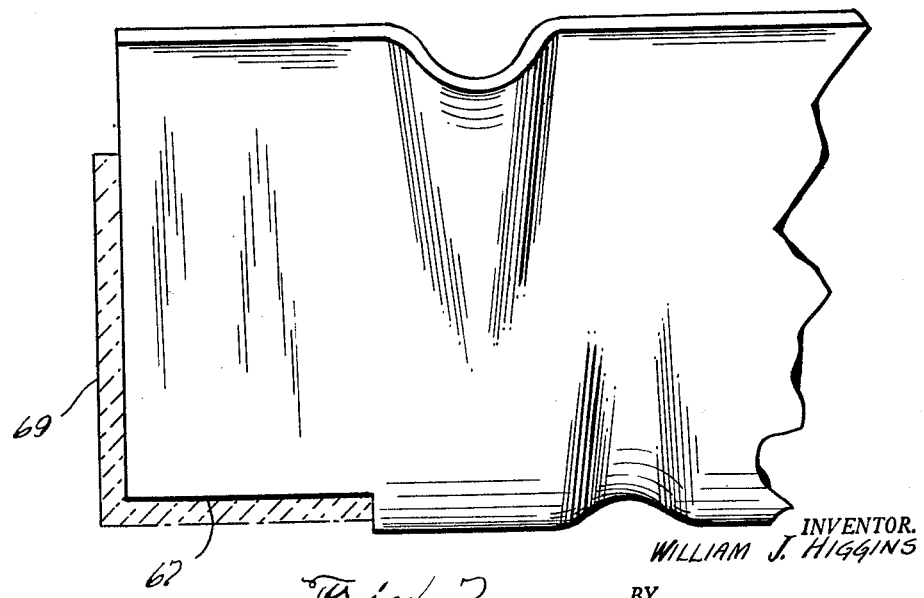
FIG. 7 is a fragmentary enlarged elevation of the pallet of FIG. 3, showing the relation thereof to the angle member of an angle sling.

In the modified form of the invention shown in FIGS. 3, 4 and 7, full nesting of all elements is afforded. As shown, the pallet comprises a corrugated sheet metal rectangle 49, preferably formed integrally from a single piece. A platform for a load is defined by parallel longitudinal deck portions 51 all disposed in a common horizontal plane. Adjacent deck portions are bridged by a plurality of depending tapered U-shaped members 53, 55 and 57 forming the legs for the platform. The legs are so tapered that each can be nested in the like leg of another pallet.

A plurality of openings 59 are stamped out of each of members 53, 55 and 57 to permit passage of the forks of a lift truck therethrough. A plurality of transverse ribs 61 bridge the deck portions between members 53 and 55, and between members 55 and 57. Similarly, a plurality of transverse ribs 63 extend across the outer deck portions, the deck portions that are distal member 55. An additional plurality of transverse ribs 65 are provided in the foot portions of members 53, 55 and 57. Thus, the transverse bending moment of the pallet is increased substantially by the ribs and the depending members, and the lengthwise bending moment of the pallet is increased substantially by the corrugated structure provided.

To permit facile use of the pallet of FIGS. 3, 4 and 7 with an angle sling, a shallow recess 67, preferably of the order of less than one inch in depth and four inches in length, is cut in each end of the foot portions of members 53, 55 and 57. Such recess seats conveniently the angle 69 of an angle sling 71.

It is thus apparent that the pallets of the structure herein described afford all of the significant functional features of both shipping and warehouse pallets, including means for four way fork lift entry, and, additionally, can be nested to economize importantly in shipping cube requirements.

Obviously many modifications and variations of the present invention are possible in the light of the above teachings. It is therefore to be understood that within the scope of the appended claims the invention may be practiced otherwise than as specifically described.

I claim:

1. A pallet comprising a plurality of coplanar transversely spaced elongated deck members, said deck members having a load-supporting face and an opposed nether face, a plurality of depending elongated leg members each connected between adjacent deck members, each deck member and each leg member having a plurality of transverse corrugations, each leg member being tapered for nesting engagement with the like leg member of a similar pallet, each leg member having a recess cut in the ends thereof, said recess being adapted to receive an engaging sling member, and means to receive the forks of a lift truck under the nether faces of said deck members.

2. The pallet of claim 1 further comprising a reinforcing bar secured to each leg member along the base thereof.

3. The pallet of claim 1 further comprising an end cap secured on each of said recesses.

4. The pallet of claim 1 further comprising an L-shaped end cap having an upstanding flange capping the side walls and the floor of the recessed portion of each such leg member, whereby the bars of a bar sling are adapted to engage one leg of each of said end caps.

5. A pallet comprising a plurality of coplanar transversely spaced elongated deck members, said deck members having a load-supporting face and an opposed nether face, a plurality of integral depending elongated leg members coupling adjacent deck members, said leg members being spaced to permit entry of the forks of a lift truck both lengthwise and transversely of said deck members into engagement with the nether faces of said deck members, each deck member and each leg member having a plurality of transverse corrugations, each leg member being tapered for nesting engagement with the like leg member of a similar pallet, the ends of the leg members proximate the edges of said pallet each having a recess cut therefrom whereby an engaging sling member can be received against the nether face of said deck members proximate said edges.

6. The combination of claim 5 further comprising a reinforcing bar secured to each plurality of aligned leg members along the bases thereof.

7. The combination of claim 5 further comprising an L-shaped end cap having an upstanding flange capping the side walls and the floor of the recessed portion of each such leg member, whereby the bars of a bar sling are adapted to engage one leg of each of said end caps.

8. A pallet comprising a plurality of coplanar transversely spaced elongated deck members, said deck members having a load-supporting face and an opposed nether face, a plurality of integral depending elongated leg members coupling adjacent deck members, said leg members being spaced to permit entry of the forks of a lift truck parallel thereto and between the median and the outer of said legs and each of said leg members having two cut-out portions to permit entry of the forks of a lift truck normal to the length thereof into engagement with the nether faces of said deck members, each deck member and each leg member having a plurality of transverse corrugations, each leg member being tapered for nesting engagement with the like leg member of a similar pallet, the ends of the leg members proximate the edges of said pallet each having a recess cut therefrom whereby an engaging sling member can be received against the nether face of said deck members proximate said edges.

References Cited by the Examiner

UNITED STATES PATENTS

| | | | |
|---|---|---|---|
| 1,599,953 | 9/26 | Clapp | 294—74 |
| 2,933,339 | 4/60 | Alvden | 294—67 |
| 3,053,492 | 9/62 | Post | 294—67 |

OTHER REFERENCES

Powell Bulletin X100; Powell Pressed Steel Company, Oct. 1, 1955.

SAMUEL F. COLEMAN, *Primary Examiner.*

FRANK L. ABBOTT, ERNEST A. FALLER, JR.,
*Examiners.*